United States Patent
Deshpande et al.

(10) Patent No.: US 12,098,704 B2
(45) Date of Patent: Sep. 24, 2024

(54) SYSTEM AND METHOD FOR MITIGATING LOADS ACTING ON A ROTOR BLADE OF A WIND TURBINE

(71) Applicant: General Electric Company, Schenectady, NY (US)

(72) Inventors: Ameet Shridhar Deshpande, Schenectady, NY (US); Shuang Gu, Shanghai (CN); Pranav Agarwal, Fremont, CA (US); Prashanth Kumar Reddy Vaddi, Bangalore (IN); Bernard Landa, Clifton Park, NY (US); Arne Koerber, Berlin (DE)

(73) Assignee: GE Infrastructure Technology LLC, Greenville, SC (US)

( * ) Notice: Subject to any disclaimer, the term of this patent is extended or adjusted under 35 U.S.C. 154(b) by 377 days.

(21) Appl. No.: 17/071,126

(22) Filed: Oct. 15, 2020

(65) Prior Publication Data

US 2021/0115896 A1    Apr. 22, 2021

(30) Foreign Application Priority Data

Oct. 22, 2019    (CN) .......................... 201911005568.1

(51) Int. Cl.
*F03D 7/02*    (2006.01)
*F03D 7/04*    (2006.01)

(52) U.S. Cl.
CPC ........... *F03D 7/0224* (2013.01); *F03D 7/042* (2013.01); *F05B 2240/211* (2013.01);
(Continued)

(58) Field of Classification Search
CPC ........ F03D 7/0224; F03D 7/042; F03D 7/043; F03D 17/00; F05B 2270/331;
(Continued)

(56) References Cited

U.S. PATENT DOCUMENTS 7,569,945 B2    8/2009    Pedersen
8,239,071 B2    8/2012    Lausen
(Continued)

FOREIGN PATENT DOCUMENTS

EP    2840258 A1    2/2015
EP    3023635 A1    5/2016
(Continued)

OTHER PUBLICATIONS

Bossanyi, Further Load Reductions with Individual Pitch Control, Wiley Online Library, Wind Energy, vol. 8, Issue 4, Jul. 7, 2005. (Web Link Only) https://onlinelibrary.wiley.com/doi/abs/10.1002/we.166.
(Continued)

*Primary Examiner* — Christopher R Legendre
(74) *Attorney, Agent, or Firm* — Dority & Manning, P.A.

(57) ABSTRACT

A method for mitigating loads acting on a rotor blade of a wind turbine includes determining, via a state estimator of a controller, a blade state estimation of the rotor blade. The method also includes reconstructing, via the controller, one or more loading signals of the rotor blade from the blade state estimation using modal analysis such that the loading signal(s) include a lead time. Further, the method includes comparing the loading signal(s) of the rotor blade to a loading threshold. Moreover, the method includes implementing a control action based on the comparison such that the lead time provided by the loading signal(s) allows the control action to take effect before a damaging load occurs on the rotor blade.

10 Claims, 5 Drawing Sheets

(52) U.S. Cl.
CPC ..... *F05B 2260/70* (2013.01); *F05B 2270/332* (2013.01); *F05B 2270/404* (2013.01); *F05B 2270/808* (2013.01)

(58) Field of Classification Search
CPC .......... F05B 2270/332; F05B 2270/404; F05B 2270/808
See application file for complete search history.

(56) References Cited

U.S. PATENT DOCUMENTS

| | | |
|---|---|---|
| 8,261,599 B2 | 9/2012 | Jeffrey et al. |
| 9,567,978 B2 | 2/2017 | Marwaha et al. |
| 9,863,402 B2 | 1/2018 | Perley et al. |
| 9,909,562 B2 | 3/2018 | Back et al. |
| 2011/0135466 A1 | 6/2011 | Latorre et al. |
| 2012/0134813 A1 | 5/2012 | Nies et al. |
| 2014/0003939 A1 | 1/2014 | Adams et al. |
| 2014/0140844 A1 | 5/2014 | Slot |
| 2014/0271181 A1 | 9/2014 | Perley et al. |
| 2016/0369770 A1 | 12/2016 | Vuillaume et al. |
| 2017/0234300 A1 | 8/2017 | Brodsgaard et al. |
| 2017/0241404 A1 | 8/2017 | Kristoffersen |
| 2017/0260967 A1 | 9/2017 | Baek |
| 2018/0142676 A1 | 5/2018 | Pedersen |
| 2021/0115896 A1* | 4/2021 | Deshpande ............. F03D 7/043 |

FOREIGN PATENT DOCUMENTS

| | | |
|---|---|---|
| EP | 3470669 A1 | 4/2019 |
| WO | WO2010016764 A1 | 2/2010 |
| WO | WO2016/091945 A1 | 6/2016 |
| WO | WO 2018215042 A1 | 11/2018 |

OTHER PUBLICATIONS

European Search Report for EP Application No.: 20203101.9 Mar. 19, 2021.

* cited by examiner

SYSTEM AND METHOD FOR MITIGATING LOADS ACTING ON A ROTOR BLADE OF A WIND TURBINE

FIELD

The present disclosure relates generally to wind turbines and, more particularly, to a system and method for mitigating rotor blade loads acting on a wind turbine.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

The amount of power that may be produced by a wind turbine is typically limited by structural limitations (i.e. design loads) of the individual wind turbine components. For example, the blade root of a wind turbine may experience loads (e.g. such as blade tip deflection, a blade bending moment, or various blade forces) associated with both average loading due to turbine operation and dynamically fluctuating loads due to environmental conditions. Such loading may damage turbine components, thereby eventually causing the turbine components to fail. The fluctuating loads can change day-to-day or season-to-season and may be based on wind speed, wind peaks, wind turbulence, wind shear, changes in wind direction, density in the air, yaw misalignment, upflow, or similar. Specifically, for example, loads experienced by a wind turbine may vary with wind speed.

As such, it is imperative to ensure loads acting on the wind turbine do not exceed design loads. Thus, many wind turbines employ one or more sensors configured to measure the loads acting on the various wind turbine components. Though the sensors may provide the desired information, new sensor systems can be complex and expensive to install. Further, the sensors may provide inaccurate information and can be prone to fail.

Additionally, large rotors can suffer from small blade tip-tower clearance and high root bending moments, especially during extreme turbulence and extreme wind shear conditions. Conventional controllers, however, do not have specific control features for tip clearance improvements. Furthermore, existing functions have limited impact on tip clearance improvements due to inadequate bandwidth for the pitch system and actuation saturation during extreme events.

In view of the foregoing, the art is continuously seeking new and improved systems for mitigating loads acting on wind turbine rotor blades. Thus, the present disclosure is directed to systems and methods for mitigating loads acting rotor blades by providing leading time in estimated future loading signals by using both deflection and velocity of blade modes, thereby providing faster pitch responses.

BRIEF DESCRIPTION

Aspects and advantages of the invention will be set forth in part in the following description, or may be obvious from the description, or may be learned through practice of the invention.

In one aspect, the present disclosure is directed to a method for mitigating loads acting on a rotor blade of a wind turbine. The method includes determining, via a state estimator of a controller, a blade state estimation of the rotor blade. The method also includes reconstructing, via the controller, one or more loading signals of the rotor blade from the blade state estimation using modal analysis such that the loading signal(s) include a lead time. Further, the method includes comparing the loading signal(s) of the rotor blade to a loading threshold. Moreover, the method includes implementing a control action based on the comparison such that the lead time provided by the loading signal(s) allows the control action to take effect before a damaging load occurs on the rotor blade.

In an embodiment, determining the blade state estimation of the rotor blade may include receiving measurement data relating to the rotor blade from one or more sensors and determining the blade state estimation of the rotor blade based on the measurement data.

In another embodiment, the sensor(s) may include, for example, Micro Inertial Measurement Units (MIMUs), strain gauges, accelerometers, pressure sensors, vibration sensors, proximity sensors, or camera sensors.

In further embodiments, the loading signal(s) may include, for example, a blade tip deflection, a blade bending moment, or a blade force of the rotor blade.

In an embodiment, using the modal analysis may include determining deflection or velocity of a blade modal response of the rotor blade. In another embodiment, using the modal analysis further comprises using Euler-Bernoulli beam theory.

In additional embodiments, reconstructing the loading signal(s) of the rotor blade from the blade state estimation using modal analysis may include receiving a measured tip deflection of the rotor blade, a flap-wise natural frequency of the rotor blade for one or more resonant modes, and a gain for the loading signal(s) of the rotor blade, estimating a future flap-wise blade tip deflection of the rotor blade for the one or more resonant modes as a function of the measured tip deflection, the flap-wise natural frequency, and the gain for the one or more loading signals, and estimating a future blade bending moment as a function of the future flap-wise blade tip deflection of the rotor blade for the one or more resonant modes. In an embodiment, the gain may be a horizon gain.

In several embodiments, estimating the future flap-wise blade tip deflection of the rotor blade for the one or more resonant modes may include estimating the future flap-wise blade tip deflection of the rotor blade for a first resonant mode and a second resonant mode. In such embodiments, estimating the future blade bending moment as a function of the future flap-wise blade tip deflection of the rotor blade for the one or more resonant modes may include estimating the future blade bending moment as a function of the future flap-wise blade tip deflection for the first resonant mode, the future flap-wise blade tip deflection for the second resonant mode, and one or more conversion constants.

In additional embodiments, comparing the loading signal(s) of the rotor blade to the loading threshold may include comparing the future blade bending moment to the loading threshold.

In an embodiment, implementing the control action based on the comparison may include adjusting a pitch angle of the rotor blade. In one embodiment, adjusting the pitch angle of the rotor blade may include determining an updated pitch angle limit for the rotor blade based on an expected reduction in the loading signal(s) when the future blade bending moment exceeds the loading threshold. Alternatively, adjusting the pitch angle of the rotor blade may include allowing a pitch angle limit to decay exponentially to an original pitch angle limit when the future blade bending moment is below the loading threshold.

In another aspect, the present disclosure is directed to a system for mitigating loads acting on a rotor blade of a wind turbine. The system includes one or more sensors configured to generate measurement data relating to the rotor blade and a controller communicatively coupled to the sensor(s). The controller includes a processor having a state estimator programmed therein. The controller is configured to perform a plurality of operations, including but not limited to determining, via the state estimator, a blade state estimation of the rotor blade based on the measurement data, reconstructing one or more loading signals of the rotor blade from the blade state estimation using modal analysis such that the one or more loading signals include a lead time, comparing the loading signal(s) of the rotor blade to a loading threshold, and implementing a control action based on the comparison such that the lead time provided by the one or more loading signals allows the control action to take effect before a damaging load occurs on the rotor blade. It should be understood that the present disclosure may also include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved systems and methods for mitigating rotor blade loads, such as deflection and blade root bending moment, of a wind turbine. In one embodiment, for example, deflection, moment, and force are reconstructed by mode deflection and velocity of blade modal response. A prediction horizon gain can be used to provide leading time in the reconstructed signals. One or more pitch angles can be adjusted by the controller in response to the signals exceeding a loading threshold so as to reduce blade tip deflection and the blade root bending moment.

The various embodiments of the system and method described herein provide numerous advantages. For example, the present disclosure maintains rotor blade loads within predetermined limits, while also maximizing annual energy production (AEP). Thus, the present disclosure can help prevent turbine component failure caused by excessive blade loading. Moreover, the present disclosure may be implemented using existing components of the wind turbine and does not require additional sensors. As such, a user is not required to purchase, install, and maintain new equipment. Moreover, the system may be integrated with a broader control system, such as, but not limiting of, a wind turbine control system, a plant control system, a remote monitoring system, or combinations thereof.

Figure 1:
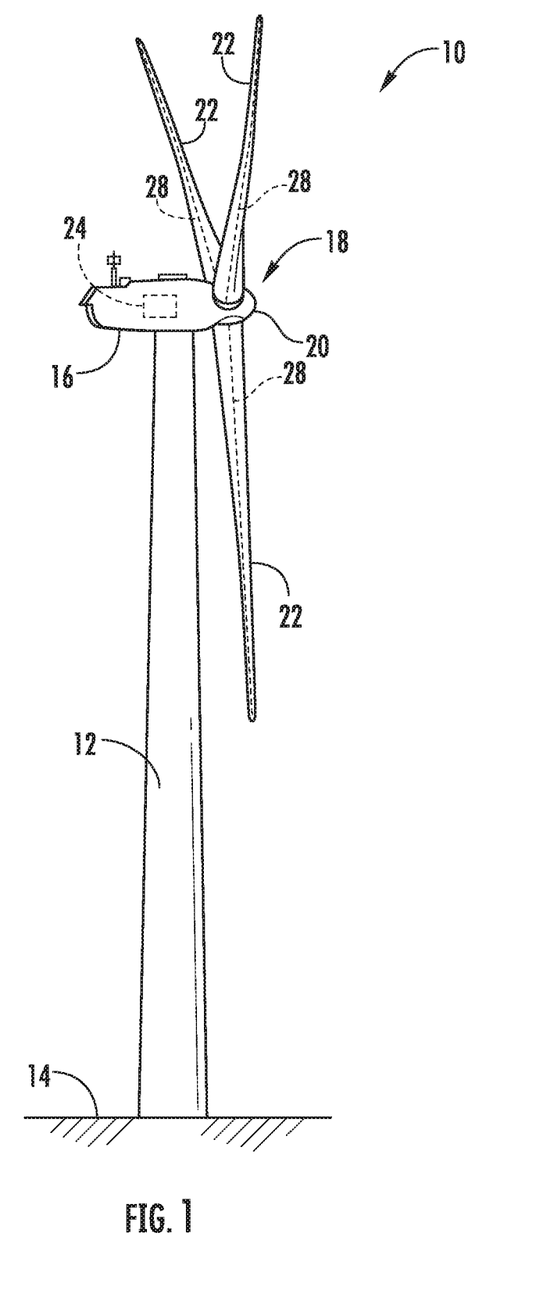
FIG. 1 illustrates a perspective view of one embodiment of a wind turbine according to the present disclosure.

Referring now to FIG. 1, a perspective view of one embodiment of a wind turbine 10 that may implement the control technology according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rate the wind turbine, and/or control various components of the wind turbine 10 as will be discussed in more detail below.

Figure 2:
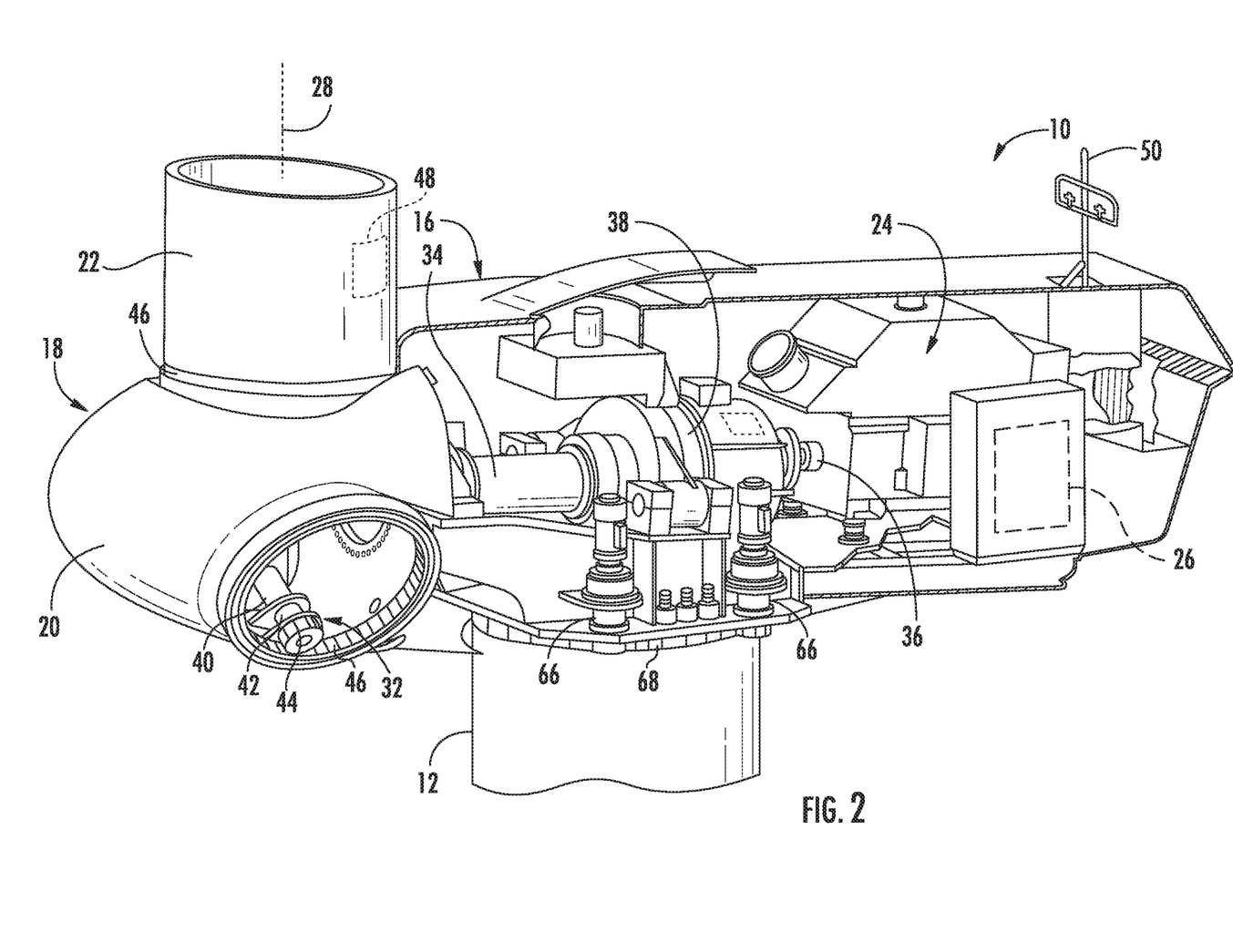
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Still referring to FIG. 2, the wind turbine 10 may also include one or more sensors 48, 50 for generating measurement data relating to the rotor blade and/or any other operating parameters that may be required to determine the various loading conditions described herein. For example, in various embodiments, the sensor(s) may include one or more blade sensors 48 for measuring a load acting on one of the rotor blades 22; generator sensors (not shown) for monitoring the generator 24 (e.g. torque, rotational speed, acceleration and/or the power output); sensors for measuring the imbalance loading in the rotor (e.g. main shaft bending sensors); and/or various wind sensors 50 for measuring various wind parameters, such as wind speed, wind peaks, wind turbulence, wind shear, changes in wind direction, air density, or similar. Further, the sensors may be located near the ground of the wind turbine, on the nacelle, or on a meteorological mast of the wind turbine.

It should also be understood that any other number or type of sensors may be employed and at any location. For example, the sensors may include, for example, Micro Inertial Measurement Units (MIMUs), strain gauges, accelerometers, pressure sensors, vibration sensors, proximity sensors, or camera sensors. It should be appreciated that, as used herein, the term "monitor" and variations thereof indicates that the various sensors may be configured to provide a direct measurement of the parameters being monitored or an indirect measurement of such parameters. Thus, the sensors may, for example, be used to generate signals relating to the parameter being monitored, which can then be utilized by the controller 26 to determine the actual parameter.

Figure 3:
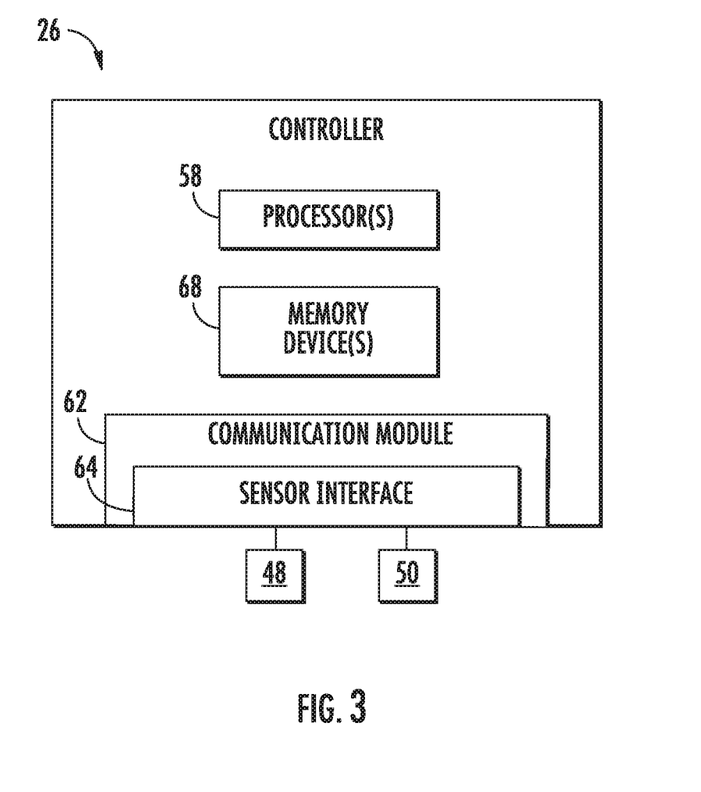
FIG. 3 illustrates a schematic diagram of one embodiment of a controller according to the present disclosure.

Referring now to FIG. 3, there is illustrated a block diagram of one embodiment of various components of the controller 26 according to the present disclosure. As shown, the controller 26 may include one or more processor(s) 58 and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50 to be converted into signals that can be understood and processed by the processors 58. It should be appreciated that the sensors 48, 50 may be communicatively coupled to the communications module 62 using any suitable means. For example, as shown in FIG. 3, the sensors 48, 50 are coupled to the sensor interface 64 via a wired connection. However, in other embodiments, the sensors 48, 50 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more current wind turbine parameters of the wind turbine 10 based on the plurality of operating data, determining a maximum wind turbine parameter, transmitting suitable control signals to implement control actions to reduce loads acting on the wind turbine, and various other suitable computer-implemented functions.

The processor 58 is configured to utilize the measured operating parameters from the sensors 48, 50 to estimate rotor blade loads (e.g. tip deflection, blade root resultant moments, and/or forces) of the wind turbine 10. For example, the sensors 48, 50 are configured to measure various wind turbine and/or environmental conditions, so as to directly or indirectly provide information regarding one or more of the following parameters: a rotor thrust, a mechanical torque, forces acting on the rotor blades 22, rotor imbalance measurements, a rotor azimuth angle, rotor speed, a gearbox ratio, a nodding moment, an overhang moment, a yawing moment, gravity, a hub radius, a blade radius, a cone angle, a blade mass, a blade weight, a center of gravity location for each of the rotor blades 22, or any other operating parameter of the wind turbine 10.

Figure 4:
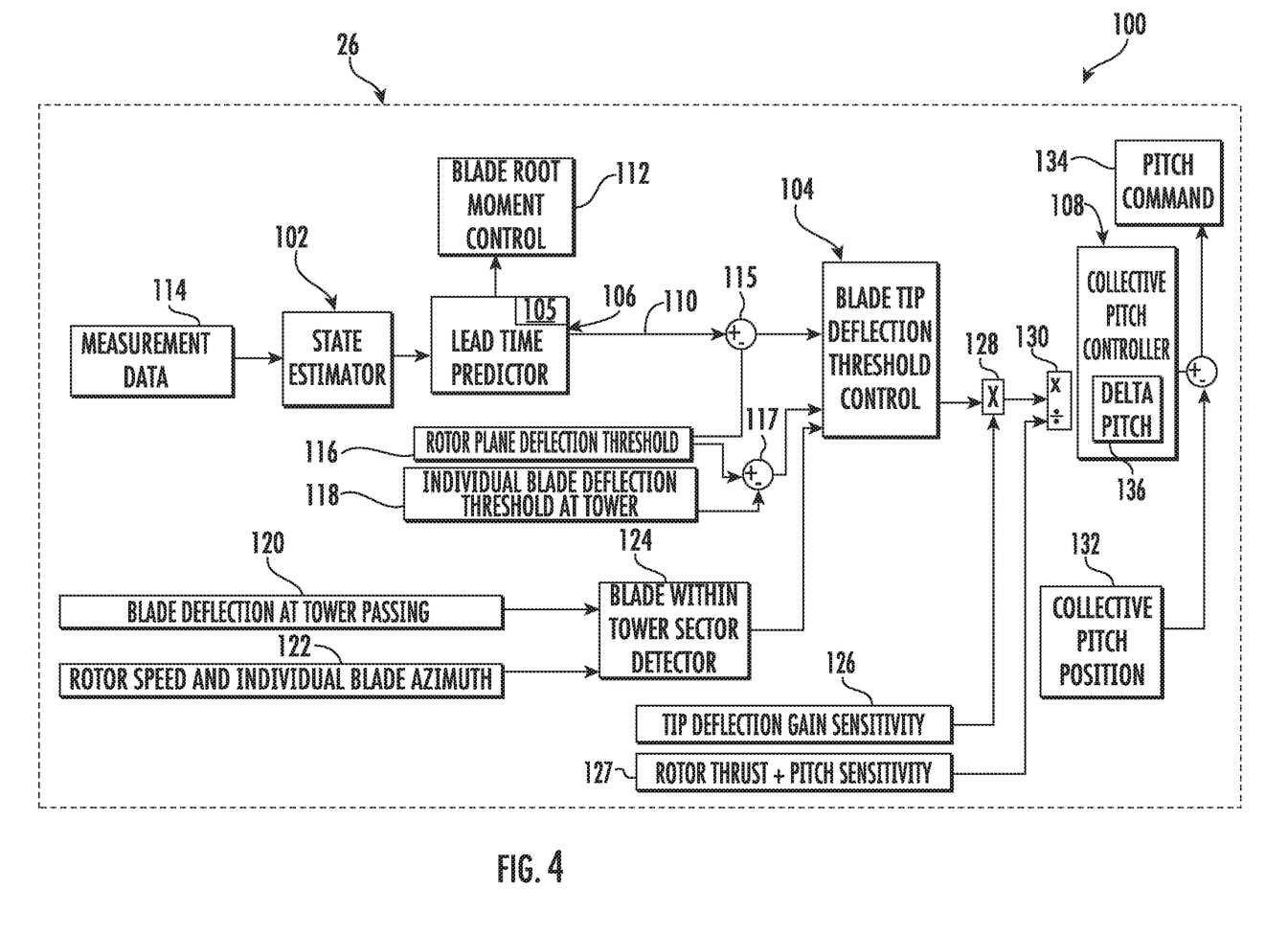
FIG. 4 illustrates a schematic diagram of one embodiment of the controller according to the present disclosure.

Referring now to FIG. 4, a schematic diagram of a system 100 for mitigating loads acting on the rotor blade(s) 22 of the wind turbine 10 according to the present disclosure is illustrated. As shown, the system 100 may include the controller 26, a state estimator 102, a blade tip deflection threshold module 104, a lead time predictor 106, and a collective pitch controller 108. More specifically, as shown, the state estimator 102 is configured to determine a blade state estimation of the rotor blade 22 based, e.g. on the measurement data 114 from the sensors 48, 50. For example, in an embodiment, the state estimator 102 may receive measurement data 114 relating to the rotor blade 22 from one or more sensors 48, 50 and determine the blade state estimation of the rotor blade 22 based on the measurement data 114. The state estimator 102 described herein permits the extraction of a greater number of features than the observed signals. For example, by measuring the data relating to the rotor blade 22, it is possible to estimate deflection, moment, velocity, force, friction, stiffness, etc., as well as other system parameters.

In addition, as shown, the lead time predictor 106 receives an output of the state estimator 102 and is configured to determine a future forecast value 110 for tip deflection and/or a blade root moment 112. As shown at 115, the controller 26 may determine the difference between the future forecast value 110 and the rotor plane deflection threshold 116. In addition, as shown at 117, the controller 26 may determine the difference between the rotor plane deflection threshold 116 and the individual blade deflection threshold 118 at the tower 12. In further embodiments, a module 124 of the controller 26 may receive the blade deflection at the tower passing 120 and the rotor speed and individual blade azimuths 122 to detect whether the blade is within a certain tower sector.

Thus, as shown, the blade tip deflection threshold control 104 may be a selector block configured to choose a blade tip deflection delta amount based on a comparison of blade deflection within the overall rotor plane and a blade passing the tower (bottom, center of rotor azimuth). More specifically, in an embodiment, the blade tip deflection threshold control 104 may be configured to reconstruct one or more loading signals of the rotor blade 22 from the blade state estimation (from the state estimator 102) using modal analysis such that the loading signal(s) include a lead time. In an embodiment, for example, the loading signal(s) may include, for example, a blade tip deflection, a blade bending moment, and/or a blade force acting on the rotor blade 22. Moreover, as used herein, modal analysis generally refers to the study of dynamic properties of a system in the frequency domain (e.g. such as through measuring the vibration of the rotor blades 22 during operation of the wind turbine 10). As used herein, reconstruction generally refers to the determination of an original continuous signal from a sequence of equally spaced samples.

Further, as shown, the lead time predictor 106 may include a prediction horizon gain 105 that can be used to provide the lead time in the reconstructed signals, i.e. by multiplying the gain 105 by the rotor speed of the wind turbine 10. In an embodiment, for example, the horizon gain generally corresponds to a tuning knob for determining how much the velocity component is present in the prediction of deflection, with larger values providing an increased lead time.

Still referring to FIG. 4, the blade tip deflection threshold control 104 is configured to determine deflection or velocity of a blade modal response of the rotor blade 22, e.g. using Euler-Bernoulli beam theory. As used herein, Euler-Bernoulli beam theory refers generally to a simplification of the linear theory of elasticity, which provides a means of calculating the load-carrying and deflection characteristics of beams (in this case, rotor blades).

For example, in one embodiment, the blade tip deflection threshold control 104 is configured to receive a measured tip deflection of the rotor blade 22, a flapwise natural frequency of the rotor blade 22 for one or more resonant modes, and/or a gain for the loading signal(s) of the rotor blade 22. The blade tip deflection threshold control 104 can then estimate a future flap-wise blade tip deflection (e.g. $X_{Flap1\_Pre}$) of the rotor blade 22 for the one or more resonant modes as a function of the measured tip deflection, the flap-wise natural frequency, and the gain for the one or more loading signals e.g. using Equation (1) below.

$$X_{Flap1\_Pre} = K_{Gain} * \frac{\max(0, X_{dotFlap1})}{\omega_{Flap1}} + X_{Flap1} \quad \text{Equation (1)}$$

In addition, the blade tip deflection threshold control 104 may also estimate the future flap-wise blade tip deflection of the rotor blade 22 for a first resonant mode ($X_{Flap1\_Pre}$) and a second resonant mode ($X_{Flap2\_Pre}$).

Thus, in an embodiment, the blade tip deflection threshold control 104 can then estimate a future blade bending moment (e.g. MyBPre) as a function of the future flap-wise blade tip deflection of the rotor blade for the one or more resonant modes. In such embodiments, the blade tip deflection threshold control 104 can then estimate the future blade bending moment as a function of the future flap-wise blade tip deflection for the first resonant mode ($X_{Flap1\_Pre}$), the future flap-wise blade tip deflection for the second resonant mode ($X_{Flap2\_Pre}$), and one or more conversion constants, e.g. using Equation (2) below.

$$M_yB_{Pre} = X_{Flap1\_Pre} * K_{Flap1_{toMom}} + X_{Flap2\_Pre} * K_{Flap2_{toMom}} \quad \text{Equation (2)}$$

Table 1 below provides definitions of the variables used in Equations (1) and (2):

TABLE 1

| Variable | Definition |
| --- | --- |
| Variable | Definition |
| $K_{Flap1\text{-}to\text{-}mom}$ | constant to convert blade tip deflection to bending moment for 1st resonant mode |
| $K_{Flap2\text{-}to\text{-}mom}$ | constant to convert blade tip velocity to bending moment for 2nd resonant mode |
| $K_{gain}$ | gain scaling factor to adjust sensitivity of 2nd resonant mode contribution |
| $\omega_{Flap1}$ | blade flap 1st resonant mode natural frequency |
| $X_{Flap1}$ | blade tip deflection for 1st flap resonant mode, actual measured value |
| $X_{dotFlap1}$ | blade tip velocity for 1st flap resonant mode, actual measured value |
| $M_yB_{Pre}$ | blade root bending moment in flap direction, future predicted value |

TABLE 1-continued

Variable Definitions

| Variable | Definition |
| --- | --- |
| $X_{Flap1\_Pre}$ | blade tip deflection for 1st flap resonant mode, future predicted value |
| $X_{Flap2\_Pre}$ | blade tip deflection for 2nd flap resonant mode, future predicted value |

Still referring to FIG. 4, as shown at 128, a tip deflection gain sensitivity 126 may be multiplied by the output of the blade tip deflection threshold control 104. Further, as shown, the output of 128 may be combined with the rotor thrust and pitch sensitivity 127 as shown at 130.

The collective pitch controller 108 is then configured to regulate the pitch command 134 for all of the rotor blades 22 using the output of 130. More specifically, as shown, the collective pitch controller 108 may determine a delta pitch command 136 for an individual rotor blade 22 in the rotor plane or at a tower crossing sector that requires a delta pitch amount be added to the total command to control blade tip deflection. More specifically, in an embodiment, the collective pitch controller 108 is configured to receive the loading signals and compare them to a loading threshold. For example, in one embodiment, the collective pitch controller 108 is configured to compare the future blade bending moment to the loading threshold.

In addition, the controller 26 is configured to implement a control action based on the comparison such that the lead time provided by the loading signals allows the control action to take effect before a damaging load occurs on the rotor blade 22. For example, in one embodiment, one or more pitch angles can be adjusted by the controller 26 in response to the signals exceeding the loading threshold so as to reduce blade tip deflection and the blade root bending moment.

More specifically, in an embodiment, the controller 26 may be configured to determine an updated pitch angle limit for the rotor blade 22 based on an expected reduction in the loading signal(s) when the future blade bending moment exceeds the loading threshold. Alternatively, in an embodiment, the controller 26 may be configured to allow a pitch angle limit to decay exponentially to an original pitch angle limit when the future blade bending moment is below the loading threshold.

Further, it should be understood that the control action as described herein may encompass any suitable command or constraint by the controller 26. For example, in several embodiments, the control action may include temporarily de-rating or up-rating the wind turbine to prevent excessive loads on one or more of the wind turbine components. Up-rating the wind turbine, such as by up-rating torque, may temporarily slow down the wind turbine and act as a brake to help reduce or prevent loading.

De-rating the wind turbine may include speed de-rating, torque de-rating or a combination of both. Further, as mentioned, the wind turbine 10 may be de-rated by pitching one or more of the rotor blades 22 about its pitch axis 28. More specifically, the controller 26 may generally control each pitch adjustment mechanism 32 in order to alter the pitch angle of each rotor blade 22 between 0 degrees (i.e., a power position of the rotor blade 22) and 90 degrees (i.e., a feathered position of the rotor blade 22). As such, in one embodiment, the controller 26 may command a new pitch set point (e.g. from 0 degrees to 5 degrees), whereas in another embodiment, the controller 26 may specify a new pitch constraint (e.g. a constraint to ensure that subsequent pitch commands are at least 5 degrees).

In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24.

The wind turbine 10 may also be temporarily de-rated by yawing the nacelle 22 to change the angle of the nacelle 16 relative to the direction of the wind. In further embodiments, the controller 26 may be configured to actuate one or more mechanical brake(s) in order to reduce the rotational speed of the rotor blades 22, thereby reducing component loading. In still further embodiments, the controller 26 may be configured to perform any appropriate control action known in the art. Further, the controller 26 may implement a combination of two or more control actions.

Figure 5:
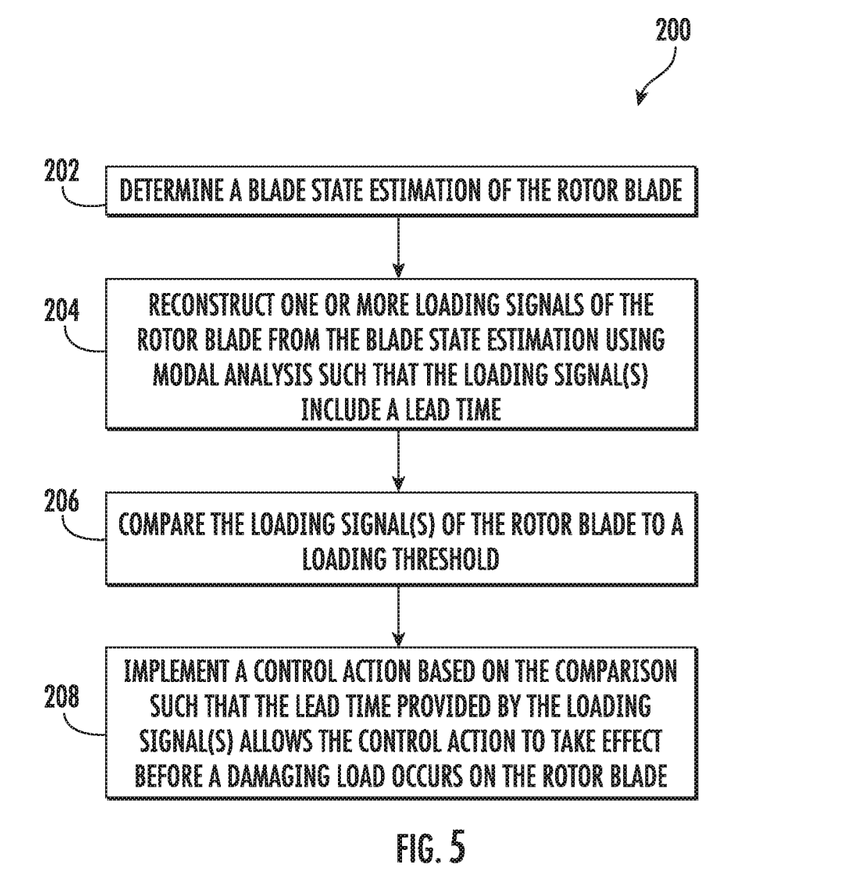
FIG. 5 illustrates a flow diagram of one embodiment of a method for mitigating loads acting on a rotor blade of a wind turbine according to the present disclosure.

Referring now to FIG. 5, a flow diagram of one embodiment of a method 200 for mitigating loads acting on a rotor blade of a wind turbine is illustrated. The method 200 may be implemented using, for instance, the turbine controller 26 discussed above with references to FIGS. 1-4. FIG. 5 depicts steps performed in a particular order for purposes of illustration and discussion. Those of ordinary skill in the art, using the disclosures provided herein, will understand that various steps of the method 200, or any of the methods disclosed herein, may be adapted, modified, rearranged, performed simultaneously, or modified in various ways without deviating from the scope of the present disclosure.

As shown at (202), the method 200 may include determining, via a state estimator 102 of the controller 26, a blade state estimation of the rotor blade. As shown at (204), the method 200 may include reconstructing, via the controller 26, one or more loading signals of the rotor blade 22 from the blade state estimation using modal analysis such that the loading signal(s) include a lead time. As shown at (206), the method 200 may include comparing the loading signal(s) of the rotor blade 22 to a loading threshold. As shown at (208), the method 200 may include implementing a control action based on the comparison such that the lead time provided by the loading signal(s) allows the control action to take effect before a damaging load occurs on the rotor blade 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for mitigating loads acting on a rotor blade of a wind turbine, the method comprising:
   determining, via a state estimator of a controller, a blade state estimation of the rotor blade based on measurement data from one or more sensors, the measurement data comprising one or more loading signals of the rotor blade;

determining a blade tip deflection of the rotor blade based on the one or more loading signals, a flap-wise natural frequency of the rotor blade for a plurality of resonant modes, and a gain for the one or more loading signals of the rotor blade, wherein the one or more loading signals includes information used to interpret a lead time;

estimating a future flap-wise blade tip deflection of the rotor blade for the plurality of resonant modes as a function of the measured tip deflection, the flap-wise natural frequency, and the gain for the one or more loading signals, wherein estimating the future flap-wise blade tip deflection of the rotor blade for the plurality of resonant modes comprises estimating the future flap-wise blade tip deflection of the rotor blade for a first resonant mode and a second resonant mode; and estimating a future blade bending moment as a function of the future flap-wise blade tip deflection of the rotor blade for the plurality of resonant modes;

comparing the future blade bending moment to a bending moment threshold; and implementing a control action based on the comparison to mitigate the loads acting on the rotor blade.

2. The method of claim 1, wherein the one or more sensors comprise at least one of Micro Inertial Measurement Units (MIMUs), strain gauges, accelerometers, pressure sensors, vibration sensors, proximity sensors, or camera sensors.

3. The method of claim 1, wherein the gain is a horizon gain.

4. The method of claim 1, wherein estimating the future blade bending moment as a function of the future flap-wise blade tip deflection of the rotor blade for the plurality of resonant modes further comprises:

estimating the future blade bending moment as a function of the future flapwise blade tip deflection for the first resonant mode, the future flap-wise blade tip deflection for the second resonant mode, and one or more conversion constants.

5. The method of claim 4, wherein comparing the future blade bending moment of the rotor blade to the bending moment threshold further comprises comparing the future blade bending moment to the loading threshold.

6. The method of claim 5, wherein implementing the control action based on the comparison further comprises adjusting a pitch angle of the rotor blade.

7. The method of claim 6, wherein adjusting the pitch angle of the rotor blade further comprises at least one of:

determining an updated pitch angle limit for the rotor blade based on an expected reduction in the one or more loading signals when the future blade bending moment exceeds the loading threshold, and allowing a pitch angle limit to decay exponentially to an original pitch angle limit when the future blade bending moment is below the loading threshold.

8. A system for mitigating loads acting on a rotor blade of a wind turbine, the system comprising:

one or more sensors configured to generate measurement data relating to the rotor blade;

a controller communicatively coupled to the one or more sensors, the controller comprising a processor having a state estimator programmed therein, the controller configured to perform a plurality of operations, the plurality of operations comprising:

determining, via the state estimator, a blade state estimation of the rotor blade based on the measurement data from the one or more sensors, the measurement data comprising one or more loading signals of the rotor blade;

determining a measured tip deflection of the rotor blade based on the one or more loading signals, a flap-wise natural frequency of the rotor blade for a plurality of resonant modes, and a gain for the one or more loading signals of the rotor blade, wherein the one or more loading signals includes information used to interpret a lead time;

estimating a future flap-wise blade tip deflection of the rotor blade for the plurality of resonant modes as a function of the measured tip deflection, the flap-wise natural frequency, and the gain for the one or more loading signals, wherein estimating the future flap-wise blade tip deflection of the rotor blade for the plurality of resonant modes comprises estimating the future flap-wise blade tip deflection of the rotor blade for a first resonant mode and a second resonant mode; and estimating a future blade bending moment as a function of the future flap-wise blade tip deflection of the rotor blade for the plurality of resonant modes;

comparing the future blade bending moment to a bending moment threshold; and implementing a control action based on the comparison to mitigate the loads acting on the rotor blade.

9. The system of claim 8, wherein the one or more sensors comprise at least one of Micro Inertial Measurement Units (MIMUs), strain gauges, accelerometers, pressure sensors, vibration sensors, proximity sensors, or camera sensors.

10. The system of claim 8, wherein implementing the control action based on the comparison further comprises adjusting a pitch angle of the rotor blade, wherein adjusting the pitch angle of the rotor blade further comprises at least one of:

determining an updated pitch angle limit for the rotor blade based on an expected reduction in the one or more loading signals when the future blade bending moment exceeds the loading threshold, and allowing a pitch angle limit to decay exponentially to an original pitch angle limit when the future blade bending moment is below the loading threshold.

* * * * *